United States Patent [19]

Salmon et al.

[11] Patent Number: 6,001,325
[45] Date of Patent: Dec. 14, 1999

[54] PROCESS FOR REMOVING ACIDS FROM LITHIUM SALT SOLUTIONS

[75] Inventors: Dennis J. Salmon, Gastonia; D. Wayne Barnette, Kings Mountain, both of N.C.

[73] Assignee: FMC Corporation, Philadelphia, Pa.

[21] Appl. No.: 08/872,018

[22] Filed: Jun. 9, 1997

Related U.S. Application Data

[60] Provisional application No. 60/031,763, Nov. 26, 1996.

[51] Int. Cl.$^6$ ....................................................... C01D 1/28
[52] U.S. Cl. ......................... 423/596; 429/206; 429/207; 429/188; 429/325
[58] Field of Search ..................................... 429/188, 206, 429/207, 325; 423/179.5, 596

[56] References Cited

U.S. PATENT DOCUMENTS

| | | |
|---|---|---|
| 3,415,687 | 12/1968 | Methlie, II . |
| 3,654,330 | 4/1972 | Wiesboeck . |
| 3,655,332 | 4/1972 | Smith, Jr. . |
| 3,887,618 | 6/1975 | Hein . |
| 4,053,571 | 10/1977 | Ebner et al. . |
| 4,065,550 | 12/1977 | Ebner et al. ............................ 423/464 |
| 4,157,376 | 6/1979 | Vulikh et al. . |
| 4,308,324 | 12/1981 | Newman ................................ 429/188 |
| 4,374,910 | 2/1983 | Glugla ................................... 429/197 |
| 5,215,684 | 6/1993 | Okabayashi et al. .................. 252/582 |
| 5,378,445 | 1/1995 | Salmon et al. . |
| 5,434,301 | 7/1995 | Kozak ..................................... 562/96 |

FOREIGN PATENT DOCUMENTS

| | | |
|---|---|---|
| 06279010 | of 0000 | Japan . |
| 06298506 | of 0000 | Japan . |
| 06298507 | of 0000 | Japan . |
| 2137732 | of 0000 | Japan . |
| 59081870 | of 0000 | Japan . |

OTHER PUBLICATIONS

Poly–4–vinylpyridinium Poly(hydrogen fluoride): A Convenient Polymeric Fluorinating Agent, George A. Olah, Xing–Ya Li, SYNLETT, pp. 267–269, May 1990.

Introduction of Hashimoto, Hashimoto Chemical Co., Ltd., 1994, distributed by Biesterfeld U.S., Inc.

Reillex Report 6, Pollution Control, 1989, distributed by Reilly Industries, Inc.

Reillex Report 2, General Applications, 1990, distributed by Reilly Industries, Inc.

International Search Report for PCT/US 97/21942 filed Nov. 25, 1997, mailed Apr. 20, 1998, J–P Clement.

*Primary Examiner*—Maria Nuzzolillo
*Assistant Examiner*—Mark Ruthkosky
*Attorney, Agent, or Firm*—Alston & Bird LLP

[57] ABSTRACT

The present invention provides a process for generating acid-free lithium salt solutions for lithium and lithium ion batteries and for preparing high purity lithium salts. The invention comprises removing acid species from lithium salt solutions such as lithium hexafluorophosphate solutions using weak base resins. The process does not require the addition of a base such as ammonia which when added to the electrolytic solution generally must be removed from the final product. Once the lithium salt has been treated by the weak base resin, the substantially acid-free lithium salt solution may be recovered from the weak base resin to provide a solution which may be used as an electrolytic solution or which may be used to prepare high purity lithium salts. The highly pure salts and solutions have a hydrogen fluoride concentration of less than 10 ppm

5 Claims, No Drawings

PROCESS FOR REMOVING ACIDS FROM LITHIUM SALT SOLUTIONS

CROSS-REFERENCE TO RELATED APPLICATIONS

This application is related to commonly owned copending provisional application Ser. No. 60/031,763 filed Nov. 26, 1996, and claims the benefit of its earlier filing date under 35 U.S.C. § 119(e).

FIELD OF THE INVENTION

This invention relates to lithium and lithium ion batteries, and particularly to a process for generating acid-free lithium salt solutions for use in lithium and lithium ion batteries and for preparing high purity lithium salts.

BACKGROUND OF THE INVENTION

Solutions of lithium hexafluorophosphate ($LiPF_6$), lithium hexafluoroarsenate ($LiAsF_6$), lithium hexafluoroantimonate ($LiSbF_6$) and lithium tetrafluoroborate ($LiBF_4$) dissolved in a variety of organic solvents have found utility in primary and secondary lithium batteries. In particular, nonaqueous electrolytic solutions comprising lithium hexafluorophosphate exhibit high electrochemical stability and conductivity. Nevertheless, the lithium hexafluorophosphate used in electrolytic solutions is susceptible to both thermal decomposition and hydrolysis, each of which are catalyzed by the presence of acidic impurities in the lithium salt or solution.

The thermal decomposition of $LiPF_6$ occurs at elevated temperatures according to Equation 1.

$$LiPF_6 \xrightarrow{heat} LiF + PF_5 \quad (1)$$

The thermal decomposition of $LiPF_6$ is typically minimized by storing the lithium salt and the lithium salt solutions under refrigerated or sub-ambient conditions.

The hydrolysis of lithium hexafluorophosphate occurs according to Equations 2–5.

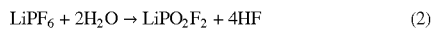
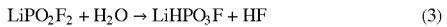
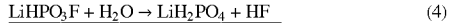
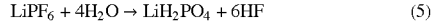

$$LiPF_6 + 2H_2O \rightarrow LiPO_2F_2 + 4HF \quad (2)$$

$$LiPO_2F_2 + H_2O \rightarrow LiHPO_3F + HF \quad (3)$$

$$LiHPO_3F + H_2O \rightarrow LiH_2PO_4 + HF \quad (4)$$

$$LiPF_6 + 4H_2O \rightarrow LiH_2PO_4 + 6HF \quad (5)$$

Hydrolysis generally occurs because of the presence of moisture and acidic impurities in the lithium salt or solution. Therefore, it is preferred that the lithium salt solution be free of all acidic impurities in order to achieve high levels of stability and performance. Nevertheless, hydrogen fluoride is a reactant in the formation of commercial grades of lithium hexafluorophosphate and trace amounts of at least 100 ppm generally remain in the lithium salt. See, e.g., *Introduction to Hashimoto*, distributed by Biesterfeld U.S., Inc. (1994).

As shown in Equations 2–5, once hydrolysis is initiated (Equation 2), the rate of hydrolysis progressively increases because hydrogen fluoride, which catalyzes the reaction, is formed as a by-product of the hydrolysis reaction. Furthermore, the Li-P-O intermediates (e.g. $LiPO_2F_2$, $LiHPO_3F$, $LiH_2PO_4$) are more easily hydrolyzed than $LiPF_6$ and thus facilitate the accumulation of HF in the lithium salt solution. Therefore, the lithium salts and lithium salt solutions preferably should be free of water, hydrogen fluoride and the Li-P-O intermediates to increase the stability and the performance of the lithium salts and lithium salt solutions. Additionally, because hydrogen fluoride and other acids are also highly detrimental to the function of the active components of lithium and lithium ion batteries, these acidic species should be removed.

One method of removing acidic impurities and thus preventing the decomposition and hydrolyzing of lithium hexafluorophosphate is to treat the salt and/or solution with a base and then maintain the salt and/or solution under basic conditions. For example, U.S. Pat. No. 5,378,445 to Salmon et al. describes the use of a base such as ammonia to prevent the acid-catalyzed decomposition of lithium hexafluorophosphate. Nevertheless, the presence of ammonia in the electrolytic solution may be detrimental to battery performance. Furthermore, the reaction products of ammonia, e.g., $NH_4F$ formed by the reaction of hydrogen fluoride and ammonia, may be detrimental to battery performance. Therefore, ammonia and its reaction products generally must be removed from the final product.

SUMMARY OF THE INVENTION

The present invention provides a process for removing acidic species from lithium salt solutions for lithium and lithium ion batteries and for the recovery of high purity lithium salts. The process does not require the addition of a base such as ammonia which when added to the lithium salt solution generally must be removed from the final product.

The process for removing acidic species from a lithium salt solution comprises contacting a solution comprising a lithium salt, a solvent, and at least one acidic species, with a weak base resin to remove the acidic species from the lithium salt solution. Typically, the lithium salt is selected from $LiPF_6$, $LiAsF_6$, $LiSbF_6$ and $LiBF_4$, and preferably is $LiPF_6$. Once treated by the weak base resin, the substantially acid-free lithium salt solution may be easily recovered from the weak base resin. The weak base resin may then be reused after washing with a basic solution to strip the acid species from the weak base resin.

According to another aspect of the invention, a lithium salt solution is provided comprising at least one lithium salt as described above and a solvent wherein the amount of hydrogen fluoride present in the solution is no more than about 10 ppm. Suitable solvents include acetonitrile, dimethyl carbonate, diethyl carbonate, ethylene carbonate, propylene carbonate, ester-based solvents, and mixtures thereof. The lithium salt solution may be combined with a positive electrode and a negative electrode to form an electrochemical cell for lithium batteries.

These and other features and advantages of the present invention will become more readily apparent to those skilled in the art upon consideration of the following detailed description which describes both the preferred and alternative embodiments of the present invention.

DETAILED DESCRIPTION OF THE INVENTION

It has been discovered that according to the process of the present invention, a weak base resin can be used to remove acids from lithium salt solutions such as lithium hexafluorophosphate solutions. The treated solutions have considerably low acidic levels thereby reducing the decomposition and hydrolysis of the lithium salt and increasing the stability of the lithium salt. Preferred embodiments of the invention are described below for the treatment of $LiPF_6$ solutions but the invention is not limited thereto and may be used with lithium salts in general such as $LiPF_6$, $LiAsF_6$, $LiSbF_6$, $LiBF_4$, and combinations thereof.

The process for removing acids from a lithium hexafluorophosphate solution comprises contacting a lithium hexafluorophosphate solution containing one or more acids with a weak base resin to remove the acids from the lithium hexafluorophosphate solution. Generally, the electrolytic solution comprises lithium hexafluorophosphate, at least one acidic species (e.g., hydrogen fluoride, $LiPO_2F_2$ or $LiHPO_3F$) and a solvent. Suitable solvents include acetonitrile, dimethyl carbonate, diethyl carbonate, ethylene carbonate, propylene carbonate, ester-based solvents (e.g. methyl acetate and methyl formate), and mixtures thereof. For example, the solvent may be a mixture of dimethyl carbonate and ethylene carbonate.

The weak base resin used to strip the acid species from the lithium hexafluorophosphate solution may be any anionic weak base resin known in the art such as type A, E, P and S weak base resins, and the like. Type S weak base resins are based on chloromethylation of a styrene resin followed by reaction of a secondary amine such as dimethyl amine. Type S resins typically possess strong base (quaternary amine) functionality initially with functionality decreasing upon cycling of the resin. Type P weak base resins are based on phenol-formaldehyde polymers with weak base functionality of the polyalkyleneamine type. Type E resins are produced by the reaction of epichlorohydrin with a polyalkyleneamine. Type A weak base resins are based on polyacrylates with the amine functionality (i.e. a mono-, di- or poly- amine) bonded to the polymer structure by an ester or amide linkage. Preferably, the weak base resin is a polyvinylpyridine resin according to the following formula:

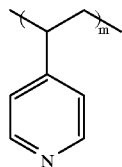

Suitable polyvinylpyridine resins are available under the Reillex™ name from Reilly Industries, Inc. Another suitable weak base resin is a tertiary amine in a styrene/divinyl benzene matrix such as Amberlyte IRA 94 from Rohm & Haas Co. Generally, because the weak base resin may contain large amounts of water, the weak base resin is dried before it is used in the acid removal process. For example, the weak base resin may be dried under a vacuum at a temperature of about 100° C. In addition, water may be further removed from the weak base resin by running a solvent through the weak base resin. Typically this solvent is the same as the solvent which is to be used in the lithium hexafluorophosphate solution which is to be run through the column.

Upon contact with a lithium hexafluorophosphate solution containing hydrogen fluoride and other acidic species, the weak base resin reacts with the acidic species. Specifically, the polyvinylpyridine resin reacts with hydrogen fluoride according to Equation 6 to form polyvinylpyridinium poly(hydrogen fluoride).

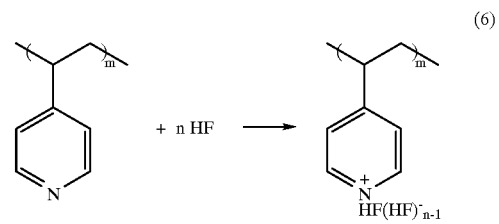

The lithium hexafluorophosphate solution is recovered from the process with reduced acid concentration. The polyvinylpyridinium poly(hydrogen fluoride) resin may then be stripped of the acid species by reacting the resin with a base. For example, ammonia may be used in an acetonitrile solvent with the stripping step proceeding according to Equation 7.

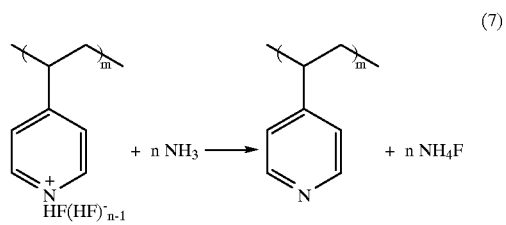

The ammonium fluoride may then be recovered in the acetonitrile solvent and the polyvinylpyridine reused in the acid removal process.

Preferably, an ion exchange column is used to contact the lithium hexafluorophosphate solution with the weak base resin but any other suitable method may be employed. When an ion exchange column is used, the column is packed with the weak base resin. The lithium hexafluorophosphate solution is then fed from the top of the column and passes through the weak base resin by gravity. In the column, the acid species from the lithium hexafluorophosphate solution reacts with a portion of the weak base resin and is removed from the solution. When the lithium hexafluorophosphate solution exits at the bottom of the column, a substantial portion of the acids have been removed. The lithium hexafluorophosphate solution may again be fed into the column or into one or more additional columns in a multistage process until the desired amount of acid is removed. The lithium hexafluorophosphate solution recovered from the weak base resin preferably possesses less than about 10 ppm of hydrogen fluoride. In addition to HF, the acid intermediates formed from the acid-catalyzed decomposition of $LiPF_6$, namely, $LiPO_2F_2$ and $LiHPO_3F$, can be removed from the solution in the treatment process.

The weak base resin may then be reused after washing with a basic solution. In the ion exchange column, the solution is generally added to the top of the column and runs through the weak base resin by gravity. The basic solution is then recovered at the bottom of the column. Generally, the basic solution or additional basic solutions are run through the column until the acid species are removed from the weak base resin. For example, the weak base resin may be treated until the pH of the basic solution recovered from the solution is the same as the pH of the basic solution when it is fed to the column thus indicating the removal of the acid species from the weak base resin. Desirably, the base used to strip the acid species from the weak base resin is provided in the same solvent that is used for the lithium hexafluorophosphate solution.

The solvent to be used for the electrolytic solution is preferably pretreated to remove water prior to combining the solvent with the $LiPF_6$ electrolyte. The water is typically removed by passing the solvent through a molecular sieve compound such as a sodium, lithium or potassium zeolite. For example, the molecular sieve compound may be provided in a packed column and the solvent to be used in the electrolytic solution fed at the top of the column and passed through the molecular sieve compound in the column by gravity. The solvent that is recovered at the bottom of the column has a lower water content than the solvent fed into the column. The pretreatment may continue in the same column or in additional columns in a multi-stage process until the water content in the solvent has been reduced to acceptable levels.

The lithium hexafluorophosphate may be treated prior to storage and use. This is typically accomplished by dissolving the $LiPF_6$ salt in a suitable solvent and treating the $LiPF_6$ solution to remove any acids which are present in the solution. The $LiPF_6$ may then be stored and used in solution or the solvent may be removed to form a high purity $LiPF_6$ salt which, in turn, may be stored or used. Preferably, acetonitrile is the solvent used for the preparation of high purity lithium salts. As a result of treatment, the $LiPF_6$ is less susceptible to thermal decomposition and hydrolysis during storage and where applicable, during the solvent removal process. In addition to or instead of treating $LiPF_6$ solutions prior to storage, $LiPF_6$ solutions may also be treated after storage and prior to use to remove any acid which has formed during the storage of the $LiPF_6$ salt.

The lithium salt solution once treated may be used as an electrolytic solution in an electrochemical cell. Typical electrochemical cells consist essentially of a positive electrode, a negative electrode, and an electrolytic solution. The positive electrode preferably comprises $LiMn_2O_4$ spinel particles, a conductive agent (e.g., graphite or carbon black), and a binder material (e.g., polyvinylidene difluoride (PVDF)). The process of the invention has been particularly useful with $LiMn_2O_4$ because of the lack of stability of the $LiMn_2O_4$ spinel in highly acidic media. The negative electrode can be lithium metal or alloys, or any material capable of reversibly lithiating and delithiating at an electrochemical potential relative to lithium metal between about 0.0 V and 0.7 V. Examples are carbonaceous materials including carbonaceous materials containing hydrogen, boron, silicon and tin, and tin oxides or tin-silicon oxides. The resulting electrochemical cell may be used alone or combined with other cells to form a lithium battery having greater storage stability than conventional lithium batteries.

The present invention will now be further illustrated by the following non-limiting examples.

Example I

Single Pass Column Treatment of $LiPF_6$ Solution

Reillex® 425 high porosity beads (polyvinyl pyridine) were dried under a vacuum at 100°C. to remove excess water. The polyvinylpyridine beads were packed into a glass column and an acetonitrile solvent was passed through the column to remove any water remaining in the polyvinylpyridine beads. Thirty pounds of $LiPF_6$ were dissolved in an acetonitrile solvent and the hydrogen fluoride content in the solution was measured at 180 ppm. The $LiPF_6$ solution was fed into the top of the column and passed through the column by gravity. The $LiPF_6$ solution recovered at the bottom of the column possessed a hydrogen fluoride content of less than 10 ppm.

Example II

Multipass Column Treatment of $LiPF_6$ Solution

Reillex® 425 beads were dried and packed in a column as described in Example I. An ethylene carbonate/dimethyl carbonate solvent was passed through the column to remove excess water. A 1M $LiPF_6$ solution in an ethylene carbonate/dimethyl carbonate solvent was measured for hydrogen fluoride content. The initial hydrogen fluoride content was 3730 ppm. The $LiPF_6$ solution was fed at the top of the column and subsequently recovered at the bottom of the column. After the first pass in the column, the $LiPF_6$ solution possessed a hydrogen fluoride content of 89 ppm. The $LiPF_6$ solution was again fed into the column and recovered. The hydrogen fluoride content of the $LiPF_6$ solution after the second pass was less than 10 ppm.

Example III

Batch Treatment of $LiPF_6$ Solution

Reillex® 425 high porosity beads were dried as described in Example I and placed in a beaker. Acetonitrile was added to the beaker, retained for a short period of time to remove any remaining water in the polyvinylpyridine beads, and removed. A 1M $LiPF_6$ solution in acetonitrile having a hydrogen fluoride content of 1300 ppm was added to the beaker. The $LiPF_6$ solution was retained in the beaker for a period of 24 hours. The recovered $LiPF_6$ solution possessed a hydrogen fluoride content of less than 10 ppm.

Example IV

Batch Treatment of $LiPF_6$ Solution Using Alternative Weak Base Resin

Amberlyte RIA-94 weak base resin beads were dried as described in Example I and placed in a beaker. Acetonitrile was added to the beaker, retained for a short period of time to remove residual water, and removed. A 1M solution of $LiPF_6$ in acetonitrile was measured for hydrogen fluoride content and had an initial hydrogen fluoride content of 1400 ppm. The solution was added to the beaker and retained for 24 hours. The $LiPF_6$ solution was removed and the hydrogen fluoride content measured at less than 10 ppm.

Example V $LiPO_2F_2$ and $LiPO_3F$ Removal

Reillex® 425 high porosity beads were dried, packed in a column and excess water extracted using acetonitrile as described in Example I. Thirty pounds of a 1M $LiPF_6$ solution in acetonitrile were measured for $LiPO_2F_2$ and $LiHPO_3F$ content. The initial $LiPO_2F_2$ content was 684 ppm and the initial $LiHPO_3F$ content was 2000 ppm. The $LiPF_6$ solution was fed at the top of the column and recovered at the bottom of the column. After the first pass, the $LiPO_2F_2$ content was less than 10 ppm and the $LiHPO_3F$ content was 680 ppm. The solution was again fed to the column. After the second pass, the $LiPO_2F_2$ content was again less than 10 ppm and the $LiHPO_3F$ content was 140 ppm.

It is understood that upon reading the above description of the present invention, one skilled in the art could make changes and variations therefrom. These changes and variations are included in the spirit and scope of the following appended claims.

That which is claimed:

1. A solution consisting essentially of a fluoride containing lithium salt and a solvent wherein the amount of hydrogen fluoride present in the solution is no more than about 10 ppm.

2. The solution according to claim 1 wherein the lithium salt is selected from $LiPF_6$, $LiAsF_6$, $LiSbF_6$, $LiBF_4$, and mixtures thereof.

3. The solution according to claim 1 wherein said lithium salt is $LiPF_6$.

4. The solution according to claim 1 wherein the solvent is selected from acetonitrile, dimethyl carbonate, diethyl carbonate, ethylene carbonate, propylene carbonate and mixtures thereof.

5. A lithium salt selected from $LiPF_6$, $LiAsF_6$, $LiSbF_6$ and $LiBF_4$ wherein the amount of HF present in the lithium salt is no more than about 10 ppm.

* * * * *